P. W. STONER.
EXPOSURE METER AND FINDER FOR CAMERAS.
APPLICATION FILED MAR. 16, 1920.
1,387,811.
Patented Aug. 16, 1921.
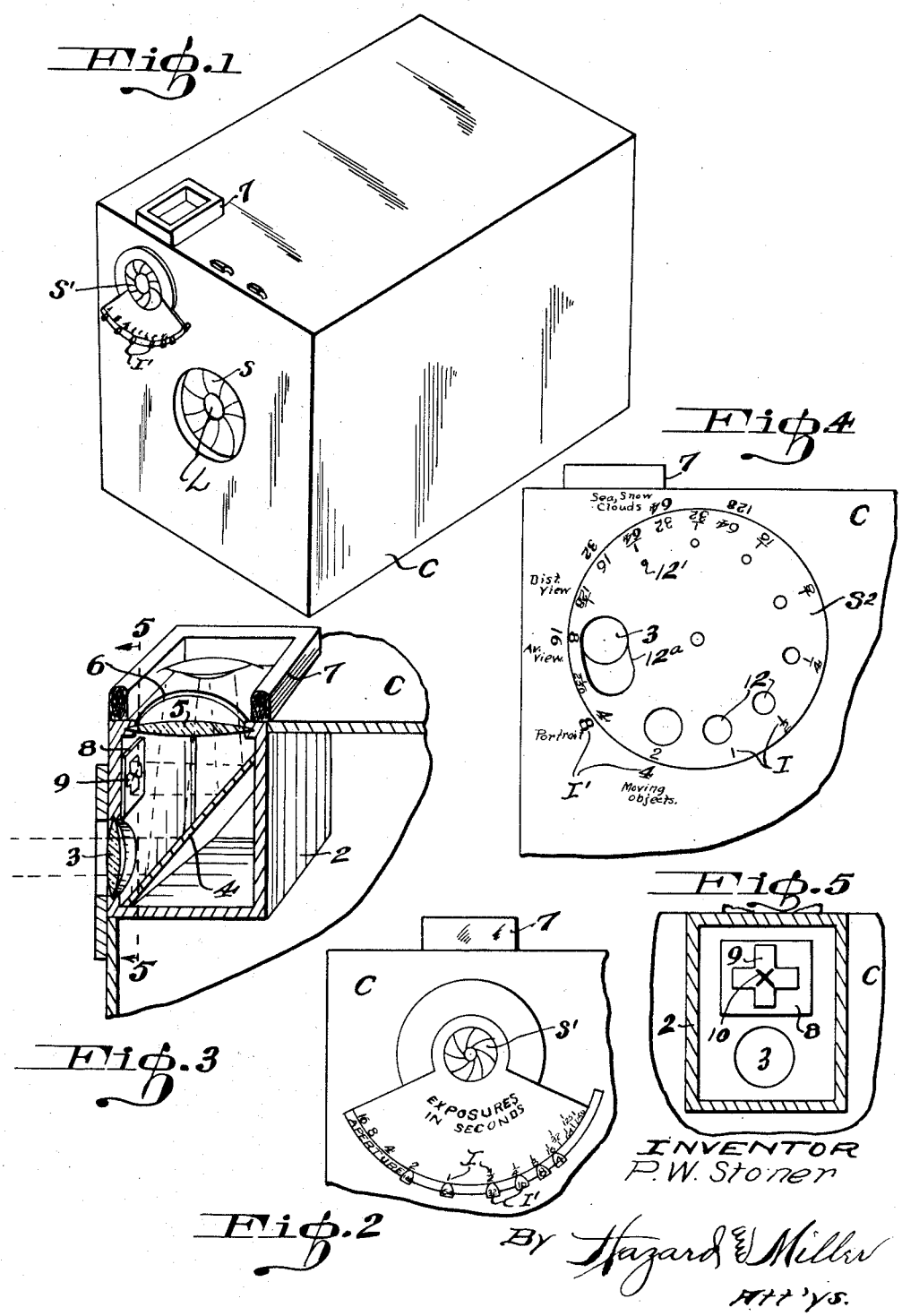

UNITED STATES PATENT OFFICE.

PETER W. STONER, OF PASADENA, CALIFORNIA.

EXPOSURE-METER AND FINDER FOR CAMERAS.

1,387,811.                Specification of Letters Patent.    Patented Aug. 16, 1921.

Application filed March 16, 1920. Serial No. 366,345.

*To all whom it may concern:*

Be it known that I, PETER W. STONER, a citizen of the United States, residing at Pasadena, in the county of Los Angeles and State of California, have invented new and useful Improvements in Exposure-Meters and Finders for Cameras, of which the following is a specification.

This invention relates to optical apparatus and particularly to photographic apparatus, and has for its object to provide an improved means for facilitating the setting of the light stop of cameras and other photographic apparatus and giving time of exposure so as to enable inexpert persons to properly set the light stops and also to eliminate the great loss of negatives because of the improper, haphazard setting and neglecting of the usual light stop mechanism. The invention consists of the construction, the combination and in details and arrangements of the parts, embodiments of which invention are shown in the accompanying drawings and described and claimed.

Figure 1 is a perspective of a camera to which the improvement is applied.

Fig. 2 is a front view on a larger scale of the light metering device.

Fig. 3 is a detail sectional view taken vertically through the central portion of the device.

Fig. 4 is a front elevation of a modified form of the device that will measure light from sunshine on the brightest day to 1/500 of that amount.

Fig. 5 is a section on line 5—5 of Fig. 3.

The present instrument is somewhat in the nature of the usual view finders commonly provided on cameras and other optical instruments and in general comprises a compartment or receptacle 2 that may be suitably mounted on, or constructed in, the instrument with which it is to be associated as for instance the camera C having the usual lens opening L. The receptacle 2 forms a cell having at one side an opening or window with a single lens 3 disposed on the front of the instrument or camera C, and within the cell is placed a suitable reflecting medium 4 here shown as inclined upwardly and rearwardly to reflect rays of light through a view showing lens 5 in a window in the top of the receptacle 2.

In the present case this window 6 is preferably surrounded by a light guard or wall 7 that may be provided with a soft surface material as felt, fabric, chamois, or any other suitable material, preferably, black so that the eye of the observer may be placed close above the lens 5 and the side lights screened out by the guard 7 in the use of the device for its particular purpose of enabling the observation, as hereinafter described, to determine the proper setting of the light stops S in the lens opening L and length of exposure.

When the eye is located at the usual height above the view finder lens 5 the latter serves for its ordinary purpose of ascertaining the position of the object with relation to the lens of the camera.

Within the cell of the receptacle or chamber 2 and in a position just above the window in which the lens 3 is located there is provided or formed a panel 8 that may be red or of any suitable color, and on this panel there is provided a distinct mark or character that is white and is shown as in the form of a cross 9. In the center of this character or figure 9 there is arranged a mark or figure of contrasting color, in this case, comprising a letter or character shown in the form of a cross mark or X designated 10 that is red in color although any other color may be utilized.

On the front of the instrument there is arranged any suitable device by which the area of the light opening in front of the window lens 3 may be changed, and in Figs. 1 and 2 such a means for varying the light opening is shown as the usual iris light stop S' comprising a number of relatively movable leaves that may be varied about a central opening or entirely closed to omit the opening, and in Fig. 4 a different form of light stop is shown as comprising a disk or wheel $S^2$ having a circular row of apertures 12 ranging in graduated sizes from the smallest opening 12' to the largest opening $12^a$ the area of which is sufficient to entirely uncover the lens 3 to permit maximum degree of light to pass into and through the view finder and to permit the object or objects that are being photographed to be readily observed on mirror 4.

The user of the device, in order to ascertain the proper setting of the light stop S of the lens L and the time of exposure has, with the present device, but to place his eye close to the screen or baffle 7 at which time the finder property disappears and nothing is viewable but the sign 9—10. By proper adjustment of the light stop device S' or S², as the case may be, the degree of light entering toward the mirror 4 can be accurately regulated. This light tends to illuminate the interior of the receptacle 2 in front of the mirror 4 and thus under the proper conditions enable the image of the sign 9—10 to be observed on the mirror.

By actual use of the device it is found that when the smaller opening of the light stops S' and S² is provided over the lens 3 if the light entering the lens is not sufficent, the sign 9—10 will be invisible and therefore it will be necessary to set the light stop to provide an opening over the lens as to admit enough light so that the sign 9—10 is just visible.

The light stops S' and S² are provided with time indicating indices I and when the respective stops have been set to provide an aperture of such size as to admit sufficient light to just illuminate the sign 9—10, then the observer has but to read the position of the index characters I with respect to a given scale I' and can then readily set the main light stop S of the lens to secure the proper admission of light into the camera in accordance with the degree of light on the object or subject that is to be photographed or that is being observed. I' are the apertures of the lens of the camera, one of these is chosen having opposite it the description of the subject to be photographed, as "Average view," "Snow," etc., then opposite this index on I will be found the correct time for exposure.

Various changes may be made without departing from the spirit of the invention as claimed.

What is claimed is:

1. The combination with a camera having a compartment in its front upper corner, an object lens in the front wall of said compartment, a view lens in the top of said compartment, a light excluding wall disposed on the top of the camera about said view lens, a reflector within the compartment between the object lens and the view lens, means for regulating the size of the opening in which the object lens is located, and there being a distinctive mark formed on the front wall of the compartment above the object lens and below the view lens.

2. The combination with a view finder having an object lens, an eye lens and a reflector, of means to indicate the proper setting of a photographic light stop, said means comprising an iris diaphragm arranged adjacent the object lens to vary the quantity of light passing through said lens, a distinctive mark arranged within the view finder immediately above the object lens and positioned to be reflected on the reflector when a given quantity of light is admitted through the object lens, and a scale on the iris to indicate the size of the opening therein.

3. In a view finder for cameras, an object lens, a view lens arranged substantially at right angles to the object lens, a distinctive mark arranged adjacent to the object lens and a reflector arranged so that said distinctive mark and the view transmitted by the object lens are simultaneously reflected to the view lens.

In testimony whereof I have signed my name to this specification.

PETER W. STONER.